United States Patent Office 3,245,949
Patented Apr. 12, 1966

3,245,949
STABILIZED POLYOLEFIN POLYMER
COMPOSITIONS
Stanley A. Murdock, 5858 Pine Hollow Road,
Concord, Calif.
No Drawing. Filed Jan. 7, 1963, Ser. No. 249,575
19 Claims. (Cl. 260—45.85)

The present invention relates to the stabilization of olefin polymer compositions against heat and oxidative deterioration by incorporating therein a small amount of a certain phosphorous-containing polyphenolic compound or polymer in combination with dilaurylthiodipropionate or distearylthiodipropionate, which combination is capable of efficiently stabilizing the polymer and simultaneously capable of withstanding rather severe polymer processing conditions.

Several compounds, including certain phenolic compounds, have been found to be of value for stabilizing polyolefins such as polypropylene and copolymers of propylene with other olefins against discoloration, degradation, and embrittlement. For the most part, the stabilizer has been added to the olefin polymer while it is in molten form. The primary attendant problem of this method of incorporating the chosen stabilizer is that the molten polymer or melt is usually of high viscosity and uniform mixing is not easily nor always attained. In some instances the polymer is first obtained in solid form and must then be heated to a molten state to incorporate the stabilizer.

When solution polymerization of the olefin monomer is employed, one of the last processing steps is the recovery of the polymer in molten condition by evaporation of the solvent. Conveniently, the addition of the stabilizer is at this final stage while the polymer is in the molten state. However, as indicated, obtaining a uniform distribution of stabilizer throughout the polymer composition is not without difficulty, and furthermore, the energy requirements for the mixing are considerable.

It has now been found that it is entirely operable to incorporate the stabilizer in the solution of polymer in solvent prior to evaporation, devolatilizing or otherwise removal of the solvent from the polymer. An excellent homogeneous blend of polymer and stabilizer is thus obtained, and blending with a high viscosity system is obviated. Unfortunately, the conventional stabilizers suited to the purpose of stabilizing such polymers are partially and sometimes essentially completely removed during the solvent removal step. For instance, one method used to remove the solvent is to pass the solution through a series of shell and tube devolatilizers which operate at temperatures in the range of 200–300° C. at 1 mm. mercury vacuum. Frequently the solution will be under these conditions for 8–10 hours. Under these severe conditions the stabilizer tends to be carried off with the solvent, or, as frequently happens, the stabilizer begins to break down or decompose. It has been found presently to be of additional advantage to incorporate a suitable stabilizer system in the polymer prior to devolatilization in that it provides an efficient means for closely controlling the molecular weight of the resulting polymer.

Accordingly, it is the chief concern and primary object of the present invention to provide highly effective stabilizers for olefin polymer compositions which will remain in and be compatible with the polymer compositions under conditions of high temperature and high vacuum.

It is a further object of the invention to provide stabilized olefin polymer compositions.

It is still further object of the invention to provide a means for efficiently and uniformly incorporating highly effective stabilizers into an olefin polymer composition.

These as well as other objects and the attendant benefits and advantages are accomplished in accordance with the present invention which comprises incorporating in a 2 to about 8 carbon-atom aliphatic olefin polymer from about 0.05 to about 0.5 weight percent, based on olefin polymer weight, of a certain variety of a phosphorous-containing polyphenolic compound or polymer, as hereinafter more fully delineated, and from about 0.1 to about 0.5 weight percent of dilaurylthiodipropionate (DLTDP) or distearylthiodipropionate (DSTDP), based on olefin polymer weight.

While each of the phosphorous-containing polyphenolic compound and the DLTDP or DSTDP individually may have stabilizing effects on the olefin polymer, surprisingly superior and far more desirable results are obtained when a combination of the phosphorous-containing polyphenolic compound with either or both of the DLTDP or DSTDP is employed. Thus, one aspect of the present invention is the finding that the polyphenolic compound and the DLTDP or DSTDP when used in combination apparently exert a synergistic effect regards their ability to efficiently stabilize the olefin polymer.

The phosphorous-containing polyphenolic stabilizers are remarkably compatible with the olefin polymer compositions and once incorporated therein remain in a generally permanent manner throughout normal usages and exposure as well as rather severe usages, exposure and processing treatments. The olefin polymer compositions containing the stabilizers are excellently enhanced with resistance to becoming discolored and embrittled by heat and oxidative deterioration. The stabilized polymer compositions can withstand, to an unusual degree, lengthy exposure to elevated temperatures in the presence of air without showing any degradive effects. This, obviously, greatly broadens and extends this field of application and utility of these polymer compositions.

The phosphorous-containing polyphenolic stabilizers are, for the most part, solids at room temperature and may be incorporated in a polymer melt in the conventional fashion by blending the stabilizer in finely divided form with the melt, or by first blending the stabilizer with a small portion of the melt prior to blending that with the main batch.

As indicated, the stabilizers employed in the present invention are advantageously adapted to be added to a solution of the polymer whereby the stabilizer becomes incorporated in the polymer upon removal of the solvent. With this technique, beneficially, the stabilizer is first dissolved or dispersed in a solvent, preferably the same solvent as that in which the polymer is dissolved, and then the stabilizer solution is added to the polymer solution. Although it is possible to add the stabilizer at any solution concentration, profitably, the stabilizer solution is admixed with the polymer solution at the most dilute stage of the polymer solution processing to facilitate mixing and to promote uniform stabilizer distribution.

The phosphorous-containing polyphenolic stabilizers that are so advantageously employed in the olefin polymer compositions in the practice of the present invention may be cursorily defined as substances that consist of the condensation products of such aromatic nuclei as hydroquinone, Bisphenol-A (p,p'-iso-propylidene diphenol) and related bisphenols, such as the bisphenol sulfones (p,p'-sulfonyldiphenol) or biphenol sulfoxides (p,p'-sulfinyldiphenol), with phosphorous oxyhalides, such as phosphorous oxychloride and equivalent oxyhalides including the oxybromide; and the partial hydrolysis products of the above indicated condensation products. More specifically, the phosphorous containing polyphenolic polymers that may be employed as stabilizers in the practice of the present invention may be represented by the general structure:

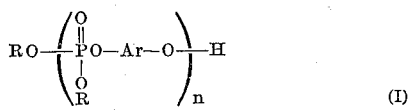

wherein Ar is a difunctional aromatic nucleus selected from the group of those derived from hydroquinone, Bisphenol-A, bisphenol sulfone, bisphenol sulfoxide, and mixtures thereof; each R is independently selected from the group consisting of p,p'-hydroxy phenyl radicals, hydrogen or an alkali metal, such as sodium, and in which any combination or mixture of the several substituents represented by R may be present in the compound; and $n$ is a number having an average value of at least one and which may be as high as 15 or more.

Even more specifically, a representative structure of a phosphorous-containing polyphenolic stabilizers in general accordance with the Formula I that is derived from hydroquinone may be depicted by the following:

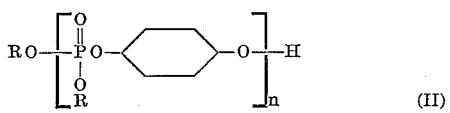

wherein $n$ and R have the same meaning as above. Preferably the molar ratio of difunctional phenol (aromatic nuclei) to phosphorous in the phosphorous-containing polyphenolic polymers is about 5 to 2, respectively, although ratios from about 3:1 to 1:1 of difunctional phenol to phosphorous, respectively, are generally quite suitable in the stabilizers.

The phosphorous-containing polyphenolic stabilizers that are utilized are preferably soluble in the common olefin polymer solvents. Thus, the maximum operable molecular weight of the polymer that is employed is somewhat limited by its necessity for having such solubility characteristics. While a precise upper limit of molecular weight is difficult to absolutely prescribe in all instances, due to the variations in the species that may be utilized, polymers having molecular weights as high as 2000 and more may frequently be employed. Ordinarily, the phosphorous-containing polyphenolic polymer that is employed has a minimum molecular weight of about 350. Frequently, it is advantageous for the phosphorous-containing polyphenolic polymers that are utilized as stabilizers in the practice of the present invention to have a molecular weight in the range from about 600 to about 1200.

As indicated, it is preferable to add a solution of the stabilizer to a polymer solution. However, complete solubility of the phosphorous-containing polyphenolic polymer stabilizer is not essential so long as it is capable of being solubilized with suitable dispersing agents, or to remain in finely divided emulsion, dispersion, or stable suspension in the solvent for the olefin polymer or in a solvent compatible and miscible with the polymer solution. The phosphorous-containing polyphenolic stabilizers are, for the most part, at least partially soluble in the common solvents for the polyolefins, as well as being soluble in lower aliphatic alcohols, i.e., methanol, ethanol, etc., ketones, aqueous sodium hydroxide or other caustic solutions.

As hereinbefore indicated, a significantly more than additive effect of the individual effects of the phosphorous-containing polyphenolic compound and the DLTDP or DSTDP on the level of stabilization of the olefin polymer is obtained when the two are used in combination. Thus, in some instances, particular species of the polyphenolic compounds under certain conditions may show but very little stabilizing ability, but when combined with the DLTDP or DSTDP outstanding and highly acceptable results are obtained, and conversely when DLTDP or DSTDP is used under certain conditions in the absence of the polyphenolic compound. In all cases, the stabilizing effects of the two combined is more than additive.

The amount of the stabilizer system that is employed in the polymer compositions in accordance with the present invention is advantageously from about 0.05 to about 0.5 weight percent, based on olefin polymer weight, of the phosphorous-containing polyphenolic compound and from about 0.1 to about 0.5 weight percent, based on olefin polymer weight of DLTDP or DSTDP. Beneficially, from between 0.1 to about 0.3 weight percent of the polyphenoic compound and from about 0.2 to about 0.4 weight percent of DLTDP or DSTDP, both based on olefin polymer weight are utilized, and, preferably, about 0.1 weight percent of the polyphenolic compound is used in combination with about 0.25 weight percent of DLTDP or DSTDP.

The olefin polymers that are treated in accordance with the invention are advantageously polymerized 2 to about 8 carbon-atom aliphatic olefins including both mono- and diolefins, such as ethylene, propylene, butylene, and butadiene (including polymerizable mixtures thereof) and particularly 1-olefins, which are so-designated because of their terminally unsaturated configuration.

In a preferred embodiment of the invention, the polymers stabilized according to the present teaching are the polyolefin polymers prepared by polymerization of monoolefinic aliphatic olefin monomers, such as ethylene, propylene, butylene and so forth (including polymerizable mixtures thereof) that contain from 2 to about 8 carbon atoms. These polymers of ethylene, propylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV-B, V-B, and VI-B metals of the Periodic System; chromium oxide on silicated alumina; hexavalent molybdenum compounds; and charcoal supported nickel-cobalt. These polymers are frequently obtained in solution by polymerizing the monoolefins in an inert solvent, preferably a hydrocarbon solvent, which may suitably be a 3 to 12 carbon atom paraffinic or aromatic hydrocarbon solvent, such as hexane, cyclohexane, and advantageously benzene, toluene and xylene.

A particular aspect of the invention is to effectively and efficiently stabilize propylene polymers, that is, homopolymeric polypropylene and copolymers of propylene and another 2 to 8 carbon olefin as described hereinabove. Preferably, the propylene polymer contains at least about 80 weight percent polymerized propylene in the polymer molecule.

The following examples are intended to further illustrate, but by no means limit, the present invention, wherein unless otherwise indicated, all parts and percentages are by weight.

*Example 1*

A solution of propylene polymer comprising about 10 percent polymer solids in xylene was introduced into a devolatilizer feed tank. Into the same tank acetone-xylene solution of the reaction product of $POCl_3$ and hydroquinone of mole ratio 3:7, respectively, and having an average molecular weight of about 887 and DLTDP was metered with the aid of a Lapp microfeeder pump in an amount so as to provide about 0.1 percent of the phosphorous-containing polyphenolic compound and about 0.25 percent DLTDP, based on the weight of the polymer. The tank was agitated to insure uniform stabilizer distribution. The solution was fed from the tank to the first of two shell and tube devolatilizers which operated at about 240–245° C. and atmospheric pressure. From there it was forwarded to the second stage devolatilizer which was maintained at about 245–250° C. and about 1 mm. Hg vacuum. The total time the solution was in the devolatilizers was about 6 hours. Polymer was recovered being essentially completed free of any residual solvent.

The stability of the polymer was evaluated by maintaining a sample of the polymer in an air oven at 140° C. and observing the time (hours) it took for a break (darkening) in color to appear.

The heat fabrication stability of the polymer, i.e., the ability of the polymer to be fabricated with heat fabrication techniques, was determined by measuring the melt index of the polymer before and after heating at 270° C. for 20 minutes. The ratio of the melt index after heating to the melt index before heating indicates fabrication stability. The lower the ratio the greater the ability of the polymer to withstand heat fabrication without reduction of molecular weight or "cracking" of the polymer.

The effectiveness of the stabilizer to reduce molecular weight loss of the polymer through the devolatilizers was also determined by measuring the molecular weight of the polymer before (feed) and after (product) it was passed through the devolatilizers. The higher the value of the ratio of the product molecular weight of the feed molecular weight the less the loss in polymer molecular weight during devolatilization.

The preceding procedure was followed excepting in one case to eliminate the addition of the phosphorous-containing polyphenolic compound, in another case to eliminate addition of the DLTDP, and in yet another case to eliminate addition of any stabilizer.

The results of the foregoing are set forth in Table 1.

departing from the intended spirit and scope of the hereindescribed invention, which is to be interpreted by the hereto appended claims.

What is claimed is:

1. A stabilized olefin polymer composition comprising a 2 to 8 carbon-atom aliphatic olefin polymer having incorporated therein from about 0.05 to about 0.5 weight percent, based on olefin polymer weight, of a phosphorous-containing polyphenolic compound having the formula:

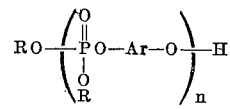

wherein Ar is a difunctional aromatic nucleus selected from the group consisting of hydroquinone, p,p'-isopropylidene diphenol, bisphenol sulfone, bisphenol sulfoxide and mixtures thereof; each R is independently selected from the group consisting of p,p'-hydroxy phenyl radicals, hydrogen, and alkali metal; and $n$ has an average numerical value from 1 to about 15; and, from about 0.1 to about 0.5 weight percent, based on polymer weight, of a thiodipropionate selected from the group consisting of dilaurylthiodipropionate and distearylthiodipropionate.

2. The olefin polymer composition of claim 1, wherein between about 0.1 and 0.3 weight percent of said poly-

TABLE I

| Sample No. | Polymer composition (wt. percent based on polymer wt.) | Weight percent POCl₃-hydroquinone reaction product (based on polymer wt.) | Weight percent DLTDP (based on polymer wt.) | Hours to break at 140° C. | Fabrication stability ratio | Ratio M.W. product/M.W. feed |
|---|---|---|---|---|---|---|
| 1 | 96% propylene/4% ethylene | 0.1 | 0.25 | 380 | 1.3 | ca. 0.90 |
| 2 | Homopolypropylene | 0.1 | 0.25 | ¹ 530 | 1.3 | ca. 0.90 |
| 3 | ----do---- | 0.1 | None | 21 | | |
| 4 | ----do---- | None | 0.25 | 100 | | |
| 5 | ----do---- | None | None | <24 | >6 | 0.70 |

¹ Average of three samples.

Example 2

The procedure of Example 1 was repeated excepting to substitute the reaction product of POCl₃ and Bisphenol-A of mole ratio 4:9, respectively, and having an average molecular weight of about 2212 for the POCl₃-hydroquinone reaction product. The results are set forth in Table II.

phenolic compound and between about 0.2 and about 0.4 weight percent of said thiodipropionate, both weights based on olefin polymer weight, are incorporated therein.

3. The olefin polymer composition of claim 2, wherein said thiodipropionate is dilaurylthiodipropionate.

4. The olefin polymer composition of claim 1, wherein said olefin polymer is a polymer of a mono-olefinic monomer.

TABLE II

| Sample No. | Polymer composition (wt. percent based on polymer wt.) | Weight percent POCl₃-bisphenol-A reaction product (based on polymer wt.) | Weight percent DLTDP (based on polymer wt.) | Hours to break at 140° C. | Fabrication stability ratio | Ratio M.W. product/M.W. feed |
|---|---|---|---|---|---|---|
| 1 | 97% propylene/3% ethylene | 0.1 | 0.25 | 260 | 1.3 | ca. 0.90 |
| 2 | 100% propylene | 0.1 | 0.25 | ¹ 463 | 1.3 | ca. 0.90 |
| 3 | ----do---- | 0.1 | None | 21 | | |
| 4 | ----do---- | None | 0.25 | 100 | | |

¹ Average of three samples.

Example 3

The procedures of Examples 1–2 are repeated excepting to substitute DSTDP for the DLTDP with similar excellent results.

Similar excellent results are obtained when other of the phosphorus-containing polyphenolic compounds and other of the olefin polymers are employed in accordance with the practice of the invention.

Other modifications and alterations will be apparent to those skilled in the art and can be entered into without 5. The olefin polymer composition of claim 4, wherein said polymer is a propylene polymer.

6. The olefin polymer composition of claim 5, wherein said propylene polymer is polypropylene.

7. The olefin polymer composition of claim 5, wherein said propylene polymer is a copolymer of propylene and ethylene.

8. The olefin polymer composition of claim 1, wherein said polyphenolic compound is a reaction product of hydroquinone and phosphorous oxychloride.

9. The olefin polymer composition of claim 1, where said polyphenolic compound is a reaction product of p,p'-isopropylidene diphenol and phosphorous oxychloride.

10. The method of preparing a stabilized olefin polymer which comprises admixing with a solution of a 2 to 8 carbon-atom aliphatic olefin polymer dissolved in a solvent for said polymer from about 0.05 to about 0.5 weight percent, based on olefin polymer weight, of a phosphorous-containing polyphenolic compound having the formula:

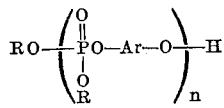

wherein A*r* is a difunctional aromatic nucleus selected from the group consisting of hydroquinone, p,p'-isopropylidene diphenol, bisphenol sulfone, bisphenol sulfoxide and mixtures thereof; each R is indpendently selected from the group consisting of p,p'-hydroxy phenyl radicals, hydrogen, and alkali metal; and *n* has an average numerical value from 1 to about 15; and from about 0.1 to about 0.5 weight percent, based on polymer weight, of a thiodipropionate selected from the group consisting of dilaurylthiodipropionate and distearylthiodipropionate; heating the solution to evaporate said solvent therefrom; and subsequently recovering said polymer.

11. The method of claim 10, wherein between about 0.1 and 0.3 weight percent of said polyphenolic compound and between about 0.2 and about 0.4 weight percent of said thiodipropionate, both weights based on polymer weight are admixed with the polymer solution.

12. The method of claim 11, wherein said thiodipropionate is dilaurylthiodipropionate.

13. The method of claim 10, wherein said olefin polymer is a polymer of a mono-olefinic monomer.

14. The method of claim 13, wherein said polymer is a propylene polymer.

15. The method of claim 14, wherein said propylene polymer is polypropylene.

16. The method of claim 14, wherein said propylene polymer is a copolymer of propylene and ethylene.

17. The method of claim 10, wherein said polyphenolic compound is a reaction product of hydroquinone and phosphorous oxychloride.

18. The method of claim 10, wherein said polyphenolic compound is a reaction product of p,p'-isopropylidene diphenol and phosphorous oxychloride.

19. The method of claim 10, wherein said polyphenolic compound and said thiodipropionate are dissolved in a solvent miscible with said solvent for said olefin polymer.

No references cited.

DONALD E. CZAJA, *Primary Examiner.*

LEON J. BERCOVITZ, *Examiner.*